3,167,577
METHOD OF PREPARING AND EMPLOYING PHOSPHORUS OXIDE SMOKES TO MAKE PHOSPHATE ESTERS
Robert W. Malone, Rahway, N.J., assignor to Esso Research and Engineering Company, a corporation of Delaware
Filed May 21, 1962, Ser. No. 196,373
10 Claims. (Cl. 260—461)

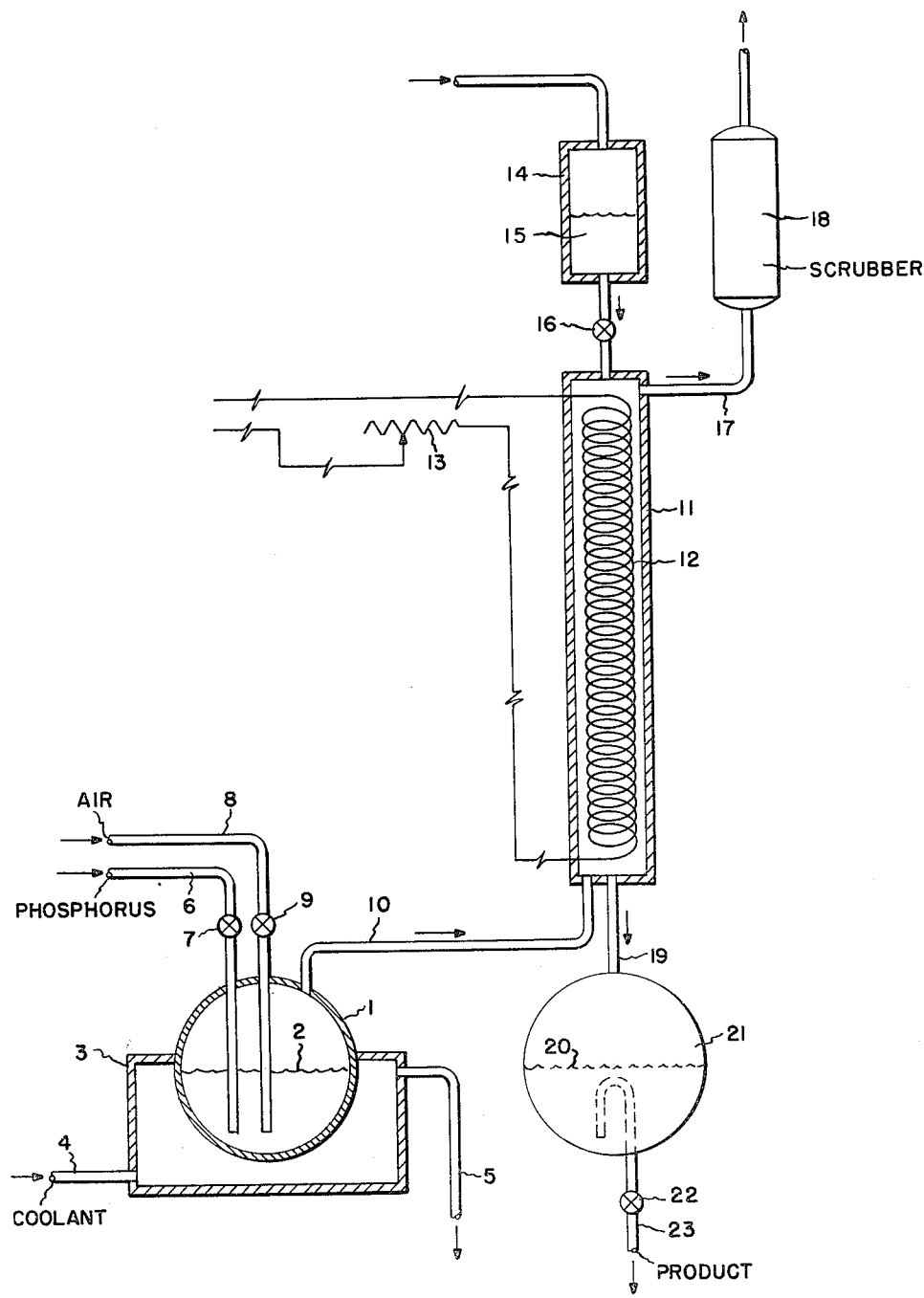

The present invention relates to a method of preparing finely divided phosphorus oxide particles and, in particular, concerns a method of preparing highly reactive phosphorus pentoxide smokes for use in the synthesis of phosphorus compounds.

Phosphorus pentoxide is a solid, crystalline material commonly employed as a dehydrating agent or as a reagent in the preparation of inorganic and organic phosphorus compounds. Due to its reactive nature and great affinity for moisture, the care, handling, transportation and storage of this compound must be accomplished with a certain degree of caution. Additionally, when phosphorus pentoxide is utilized in large-scale chemical reactions, rapid agitation or mixing means must be employed to quickly break up and dissipate the phosphorus pentoxide clumps and to prevent local overheating due to exothermic reactions.

It has now been discovered that the above difficulties associated with phosphorus pentoxide are diminished by the preparation of phosphorus pentoxide as a smoke or a cloud of finely divided particles.

It is therefore an object of this invention to provide a method of preparing phosphorus oxide smokes having utility in the synthesis of phosphorus compounds. It is also an object to provide a method of preparing phosphorus pentoxide smokes having enhanced chemical activity.

An additional object is to provide an in situ method of esterifying alcohols with elemental phosphorus. A further object is to provide a low cost in-plant method of preparing $P_2O_5$. Other objects and the scope of the invention will be apparent to those skilled in the art.

It has been found that a safe, economical method of producing phosphorus oxide smokes comprises dissolving elemental white or yellow phosphorus in a nonaqueous solvent and blowing the phosphorus-containing solvent with a gaseous stream containing oxygen or other oxidizing agent, thereby producing a finely divided, dense cloud of phosphorus oxides. The cloud of $P_2O_5$ particles is more chemically reactive than a comparative weight of crystalline $P_2O_5$. Phosphorus-containing materials are prepared by contacting the material to be treated with the $P_2O_5$ smoke. For example, the material to be treated can be the phosphorus solvent or can be dissolved in the phosphorus solvent solution, and then air blown to treat the material in situ.

Elemental phosphorus exists in a number of crystalline forms, but for the purposes of this invention, only white or yellow phosphorus is suitable. White and yellow phosphorus are soluble in many organic solvents, such as carbon disulfide, primary aliphatic alcohols, hydrocarbons such as benzene, and the like, and have a low melting point, e.g., about 115° F. or lower, and are fairly reactive. The red, violet and black phosphorus forms are unsuitable crystalline forms since they are not readily soluble in organic solvents, are not especially reactive, are less volatile than the yellow and white phosphorus and are not oxidized to $P_2O_5$ by the present method.

The employment of the low melting phosphorus is of additional benefit since both white and yellow phosphorus melt under steam temperatures, and thus can be melted and safely piped to areas of plant use. This method of handling is a positive safety factor over the bulk handling of $P_2O_5$, especially in large-scale commercial production of phosphorus materials.

The temperature at which the elemental phosphorus solvent solution is air blown and reacted with other materials to be treated with the phosphorus oxide cloud should be controlled so as to prevent overheating and the conversion of the phosphorus to the unsuitable red form.

The initial dissolving of the phosphorus in the solvent is normally not productive of excess heat. The creation of the $P_2O_5$ smoke cloud by the reaction with the oxidizing agent is exothermic, and the temperature of the phosphorus solution should be maintained at less than 150° F. or preferably between 130° F. and 145° F.

The phosphorus solvent employed in the invention can be any nonaqueous organic solvent. The presence of abnormal amounts of moisture, e.g., more than 1 wt. percent, in the solvent is to be discouraged since the $P_2O_5$ formed will react with this moisture. The solvents employed may be aliphatic, aromatic, or alicyclic solvents, e.g., hydrocarbons, such as benzene, xylene, kerosene, heptane, petroleum naphthas boiling between 100° F. and 400° F., toluene, gasoline, cyclohexane, and the like; alcohols such as $C_3$ to $C_{20}$ aliphatic or aromatic alcohols such as oxo alcohols, oxo still bottoms derived from the well-known oxo process, benzyl alcohol, ethyl alcohol, phenols, and the like; ethers such as diethyl ether and the like; halogenated hydrocarbons such as carbon tetrachloride, ethylene tetrachloride, and the like; and carbon disulfide, and the like or any combination thereof. Preferred solvents include carbon disulfide, diethyl ether, benzene and oxygenated aliphatic organic solvents like alcohols. The organic solvents utilized are preferably those that do not appreciably dissolve $P_2O_5$, since this would allow the $P_2O_5$ concentration in the solvent to wastefully increase, and would fail to provide the optimum amount of $P_2O_5$ in the smoke cloud until the $P_2O_5$ saturation level of the solvent was reached.

In generating phosphorus oxide smokes for use in separate reactors, the solvent should react only slightly with the elemental form of phosphorus used, since otherwise this would result in the wasteful formation of phosphorus esters and a higher required concentration level of phosphorus for smoke production. Of course, in the in situ preparation of phosphorus compounds, a reactive solvent is desirable.

For the purposes of this invention, the concentration of phosphorus in the solvent may normally vary between 0.1 and 50 wt. percent, preferably between 1 and 5 wt. percent.

The quantity of elemental phosphorus will of course depend upon the purpose for which the $P_2O_5$ smoke is to be used. For in situ preparations, a stoichiometric quantity or a slight stoichiometric excess can be advantageously employed.

Particularly preferred solvents are those oxygenated hydrocarbon solvents such as $C_6$ to $C_{22}$ alkanols such as $C_6$ to $C_{10}$ primary alcohols, e.g., oxo alcohols, and the liquid oxo bottoms which comprise a mixture of oxygenated organic components. The process for preparing oxo alcohols and the oxo bottoms is found in U.S. Patents 2,327,066, 2,504,682 and 2,955,928 and in many subsequent patents.

The gaseous stream blown through the phosphorus solution to generate the cloud of phosphorus compound particles can be any gaseous stream containing oxygen or a gaseous oxidizing medium which will oxidize the dissolved elemental phosphorus. Many oxidizing agents are suitable, e.g., air, oxygen, ozone, chlorine, bromine, fluorine, sulfur, elemental selenium, tellurium, and mixtures thereof. The most economical gaseous stream is, of course, air; but the gaseous stream can be an oxygen enriched air, e.g., 21 to 30 vol. percent oxygen or higher, or an oxygen poor air stream containing less than 20 vol. percent oxygen, or pure oxygen with or without an inert carrier gas such as nitrogen, natural gas, $CO_2$, or the like. The carrier gas should preferably be relatively inert with $P_2O_5$ or the other phosphorus compounds generated, and not readily soluble in the solvent.

The pressure and flow rate of the gaseous stream may be adjusted to provide suitable agitation and to control the quality and quantity of the smoke cloud. The partial pressure of the oxygen in the gaseous stream can vary, e.g., between 1 p.s.i. and 100 p.s.i., preferably between 15 p.s.i. and 60 p.s.i. The flow rate of the gaseous stream is dependent upon the rate of reaction and agitation desired, but can range from 1 liter/hour/mole of reactant to 100 liters/hour/mole of reactant.

It is within the contemplation of the invention that the oxygen content of the gaseous stream be restricted and controlled to produce clouds of phosphorus oxides like $P_2O_3$, $P_2O_4$ or other oxides as desired.

The clouds of $P_2O_5$ produced by the described method have particular utility in preparing phosphorus-containing materials such as esterifying, in whole or in part, organic alcohols such as the alkanols previously described. Other suitable materials to be treated with the $P_2O_5$ smokes include basic reagents, e.g., amines, ammonia, hydrous nitric and sulfuric acids, organic amides, methylarylcarbinols, halides like calcium fluoride and hydrochloric acid, basic oxides, and some inorganic carbonates and sulfates.

The highly reactive $P_2O_5$ cloud may be placed in contact with the material to be treated with $P_2O_5$ by various methods such as by bubbling the cloud through a liquid solution containing the material either alone or in a $P_2O_5$ inert solvent such as benzene, carbon tetrachloride, or the like. Additionally, the smoke cloud can contact the material to be treated by countercurrent stream methods whereby the descending material in a spray form or in a packed column is allowed to react with an ascending cloud of $P_2O_5$ particles.

Additionally, the preparation of treated material in situ is accomplished by dissolving the material to be treated in the phosphorus solvent, and then blowing the solution with the oxygen-containing gaseous stream. The material to be treated may be the same as the phosphorus solvent, that is, an oxygenated organic compound such as an alcohol or mixtures of alcohols, aldehydes, ketones, etc., as present in oxo still bottoms. This may be done in a batch process or in a continuous manner by continually withdrawing a portion of the mix. A batch process is normally carried out by adding the stoichiometric quantity of the elemental phosphorus to the solvent, then adding the material to be treated, and circulating air through the solution. Of course, the phosphorus solvent may also be the material to be treated; for example, a stoichiometric quantity of elemental phosphorus may be dissolved in a $C_6$ to $C_8$ oxo alcohol and a stream of air circulated through the solution to form the phosphorus acid alcohol esters.

The nature of the instant discovery is particularly described in the following examples and by the accompanying drawing which shows a laboratory apparatus for carrying out the instant invention.

The drawing shows a laboratory apparatus for generating phosphorus oxide smokes and preparing phosphorus compounds by the countercurrent method.

There is shown a generator 1 containing a phosphorus solvent 2 surrounded by a circulating water bath 3 or other means to control the temperature of reaction in the generator, having a cold water inlet 4 and a water outlet 5. The sealed generator vessel has a controlled phosphorus inlet conduit 6 with a valve 7 for admitting melted white or yellow phosphorus into the generator, a gaseous conduit 8 to admit a controlled flow of air or other oxidizing gas stream to the vessel, the flow rate being controlled by a valve 9, and an outlet smoke conduit 10 which permits the passage of the generated $P_2O_5$ smoke cloud to the lower portion of a packed column or bubble tower 11, containing inert packing material such as glass wool, porcelain, glass beads and the like. Additionally, the smoke conduit 10 could also be employed to introduce the phosphorus oxide smoke beneath the liquid surface of a separate treating or reaction vessel containing the liquid to be contacted with $P_2O_5$. Heat can be supplied to the tower by an electric coil 12 controlled by a variable resistance 13, thereby allowing the tower to be maintained at a desired temperature. It is desirable to maintain the tower at a temperature of from 130° to 150° F. Mounted on the upper portion of the tower is a dropping funnel 14 containing the material 15 to be treated with the phosphorus smoke and a valve 16 to control the flow of the material into the tower. Also shown at the upper portion of the tower is an exhaust conduit 17 for removing unreacted $P_2O_5$ smoke and, if desired, a glass wool or other scrubber 18 can be employed. Communicating with the lower portion of the tower is an outlet conduit 19 which discharges the phosphorus treated product 20 into a product receiving vessel 21 from which it may be withdrawn through a valve 22 in the product outlet conduit 23.

In the operation of the process with the apparatus shown in the drawing, a phosphorus solvent such as isooctyl alcohol is placed in the generator vessel 1 and a predetermined amount of liquid white or yellow phosphorus admitted through the phosphorus inlet conduit; the solvent containing the dissolved phosphorus is then blown with air which is admitted through the gaseous inlet conduit. The reaction of the phosphorus with oxygen is exothermic, and thus the flow of water in the water bath is adjusted to provide proper temperature control. The dense cloud of $P_2O_5$ generated passes from the generator vessel to the bottom of the tower and ascends upwardly through the packed tower. The material such as isooctyl alcohol, which is to be treated with the $P_2O_5$, is contained in the dropping funnel and allowed to percolate downwardly through the tower and to contact the ascending $P_2O_5$ cloud. The esterified isooctyl alcohol and unreacted alcohol are then discharged into the product receiving vessel. During the process, the heating coil is adjusted to provide a maximum temperature of not more than 150° F. in the tower to avoid conversion of the phosphorus to the unsuitable form. It is preferred that the tower temperature be in the range of from 130° to 150° F.

The following examples demonstate the efficacy of the instant invention.

EXAMPLE 1

Isooctyl alcohol was treated with $P_2O_5$ by dissolving 68 grams of white phosphorus in 404 grams of isooctyl alcohol in a treating vessel. Air was then introduced below the surface of the resulting solution, while the temperature of the flask was maintained below 150° F. The $P_2O_5$ reacted with the isooctyl alcohol. The results are found in Table I, Run 1.

EXAMPLE 2

Oxo bottoms and isooctyl alcohol were treated with $P_2O_5$ by the process illustrated in the drawing. Esterification reactions occurred both in the generator and in the tower. The results of this run appear in Table I, Run 2.

EXAMPLE 3

171 grams of oxo bottoms were placed in a generator vessel. 13 grams of white phosphorus were dissolved in the oxo bottoms. Air was bubbled through the resulting solution, while maintaining the solution at a temperature below 150° F. The $P_2O_5$ cloud which was generated was passed through a conduit and by means of a sparger bubbled through 404 grams of isooctyl alcohol contained in a treating vessel. Esterification reactions occurred both in the generator flask and in the treating vessel. Reaction results appear in Table I, Run 3.

Table I
PHOSPHORUS ESTERIFICATION BY $P_2O_5$ SMOKES

| Run | Generator/Reactor | Material in Generator Vessel | Material in Treating Vessel | Wt. Percent Phosphorus Ester Obtained in— | |
|---|---|---|---|---|---|
| | | | | Generator | Treating Vessel |
| 1 | Generator/in situ | Isooctyl alcohol | | [2] 8.07 | |
| 2 | Generator/packed column [1] | Oxo bottoms | Isooctyl alcohol | 2.25 | 0.68 |
| 3 | Generator/reactor | do | do | 5.13 | 0.41 |

[1] As in Figure 1.
[2] After ammoniation.

The oxo bottoms employed were the still pot residues after the distillation of the alcohol fraction wherein $H_2$, CO and a $C_2$ to $C_{15}$ olefin are contacted at elevated temperatures and pressures in the presence of a carbonylation catalyst to produce an aldehyde product which is subsequently hydrogenated to the alcohol product, which product is removed by distillation. In the carbonylation of a heptene fraction obtained from propylene-butylene copolymerization, for example, the bottoms represent about 15 to 30% of the crude alcohol charged to the distillation zone. The bottoms consist primarily of highly branch chained $C_{16}$ alcohols, $C_{24}$ acetals, $C_{16}$ ethers, both saturated and unsaturated, and minor amounts of other oxygenated compounds, such as aldols, esters, and the like. A typical analysis of the composition obtained from carbonylation of a heptene polymer fraction is as follows:

|  | Percent (weight) |
|---|---|
| $C_{16}$ alcohols | 48.6 |
| $C_{24}$ acetals | 19.1 |
| $C_{16}$ ethers | 17.4 |
| $C_{22}$ esters | 14.7 |
| $C_{16}$ ketones/aldehydes | 0.2 |

Inspection of the product is as follows:

| | |
|---|---|
| Hydroxyl No. | 95 |
| Free carbonyl No. | 0.5 |
| Combined carbonyl No. | 29 |
| Saponification No. | 21 |
| Gravity, ° API | 33.3 |
| Acid No. | 0.2 |

As can be seen, the blowing of the white phosphorus with air at temperatures less than 150° F. created prosphorus alcohol or bottom esters or mixtures in both the geenrator vessel and the column and the reactor vessels. The highly reactive $P_2O_5$ smoke may be used for the manufacture of phosphorus compounds having subsequent utility as gasoline and lubricating oil additives, plasticizers, and the like.

EXAMPLE 4

A dense highly reactive cloud of $P_2O_5$ particles is generated by dissolving 109 grams of yellow phosphorus in 200 ml. of benzene in a 500 ml. generator flask, and blowing the resulting solution with air while controlling the temperature of the generator vessel between 130° and 145° F. This cloud of $P_2O_5$ is then employed to esterify isooctyl alcohol by allowing the $P_2O_5$ cloud to percolate upwardly through a glass wool packed tower in which isooctyl alcohol is descending and recovering the esterified isooctyl alcohol and unreacted alcohol at the lower end of the preheat tower.

This invention has been described and disclosed with respect to certain preferred embodiments, and there will become obvious to persons skilled in the art various modifications, equivalents, or variations thereof which are intended to be included within the scope of this invention.

What is claimed is:
1. A process for treating alkanols with phosphorus oxide, which process comprises:
   dissolving elemental phosphorus having a melting point of less than about 115° F. in an organic solvent,
   blowing the solvent-phosphorus solution with air while maintaining the temperature of the solution below 150 F.,
   contacting the alkanol with the phosphorus oxide particles and recovering the phosphorus ester product.
2. A process according to claim 1 wherein alkanol is a $C_6$ to $C_{12}$ alkanol.
3. A process according to claim 2 wherein a $P_2O_5$ cloud is contacted with an alkanol by bubbling said cloud through a countercurrent stream of said alkanol.
4. A process according to claim 2 wherein said contacting is accomplished by discharging the phosphorus oxide cloud directly beneath the surface of said alkanol.
5. A process for the in situ preparation of organic phosphorus ester compounds, which process comprises:
   dissolving elemental phosphorus having a melting point of less than about 115° F. in an organic solvent,
   adding to the phosphorus solvent solution an alkanol,
   blowing the phosphorus-solvent solution with an oxygen-containing gas to form phosphorus oxide while maintaining the temperature at less than 150° F., and thereby effecting the desired reaction between the resulting phosphorus oxides and the alkanol.
6. A process as defined by claim 5 wherein the phosphorus solvent and the alkanol to be treated are alkanols.
7. A process according to claim 5 wherein said elemental phosphorus is white phosphorus.
8. A process according to claim 5 wherein said elemental phosphorus is yellow phosphorus.
9. A process according to claim 5 wherein said organic solvent is an alkanol.
10. A process for the in situ preparation of organic phosphorus ester compounds, which comprises:
    dissolving elemental phosphorus having a melting point of less than about 115° F. in an organic solvent,
    adding to the phosphorus solvent solution an alkanol to be treated with phosphorus oxides,
    blowing the phosphorus-solvent solution with an oxygen-containing gas to form phosphorus oxide while maintaining the temperature at less than 150° F., and thereby effecting the desired reaction between the resulting phosphorus oxides and the alkanol.

References Cited in the file of this patent
UNITED STATES PATENTS

| | | |
|---|---|---|
| 2,574,466 | Clay et al. | Nov. 13, 1951 |
| 2,586,897 | Woodstock | Feb. 26, 1952 |
| 2,658,874 | Clay et al. | Nov. 10, 1953 |
| 2,733,217 | Woyski et al. | Jan. 31, 1956 |
| 2,798,799 | Woyski et al. | July 9, 1957 |
| 2,978,478 | Sandner et al. | Apr. 4, 1961 |

OTHER REFERENCES

Van Wazer: "Phosphorus and Its Compounds," vol. 1, 1958, pp. 97, 109 and 268, Interscience Publishers, Inc., New York, N.Y.